United States Patent [19]

Brinker et al.

[11] Patent Number: 4,922,569

[45] Date of Patent: May 8, 1990

[54] HAND TOOL

[75] Inventors: Barry Brinker; John E. Busse, both of Cincinnati, Ohio

[73] Assignee: 'totes', incorporated, Loveland, Ohio

[21] Appl. No.: 353,810

[22] Filed: May 18, 1989

[51] Int. Cl.⁵ .............................................. A47L 1/08
[52] U.S. Cl. ...................................... 15/105; 15/111; 15/117; 15/143 B; 15/144 R; 15/236.02
[58] Field of Search ................ 15/105, 106, 114, 117, 15/236.02, 144 R, 145, 143 B, 144 B, 111

[56]  References Cited

U.S. PATENT DOCUMENTS

| D. 270,105 | 8/1983 | Erickson | D32/42 |
| D. 282,604 | 2/1986 | Whitaker | D4/118 |
| 509,237 | 11/1893 | Olsen et al. | 15/144 R X |
| 603,581 | 5/1898 | Urmston | 15/117 |
| 2,523,073 | 9/1950 | Stacey et al. | 15/144 R |
| 2,832,980 | 5/1958 | O'Neill | 15/117 X |
| 2,908,929 | 10/1959 | Cotman | 15/111 X |
| 3,051,975 | 9/1962 | Schwartz | 15/117 X |
| 3,690,331 | 9/1972 | Messer | 15/144 B X |
| 3,968,535 | 7/1976 | Nichols | 15/117 X |
| 4,281,433 | 8/1981 | Sendoykas | 15/117 X |
| 4,302,862 | 12/1981 | Machacek et al. | 15/117 |

Primary Examiner—Chris K. Moore
Attorney, Agent, or Firm—Wood, Herron & Evans

[57] ABSTRACT

A manually usable hand tool having, in preferred form, a frame of substantially rectangular closed loop configuration. Squeegee and ice scraper blades are fixed to one frame end, and a brush is fixed to an adjacent frame side. A handle is pivotally connected to the frame, and is movable between a storage position generally co-extensive with the other frame side and an extended position directed away from the closed loop frame and generally co-axial with the frame's longitudinal axis. The handle and the frame are grippable together by a user if desired upon use of the hand tool when the handle is in the storage position and, alternatively, the handle is grippable alone by a user if desired upon use of the hand tool when the handle is in the extended position.

16 Claims, 2 Drawing Sheets

HAND TOOL

This invention relates to hand tools. More particularly, this invention relates to a manually usable ice scraper.

Hand held ice scrapers are very well known to the prior art. Indeed, a significant percentage of American motorists carry ice scrapers in their automobiles during the winter months in northern climates where ice and snow is periodically expected. A typical ice scraper includes an extended length handle with a brush at one end of the handle for sweeping snow from, e.g., a car's windows after snowfall. A rubber squeegee blade and a rigid ice scraper blade are fixed at the other end of the handle so that if, for example, an owner's car is parked outdoors overnight and frost is received, that frost can be easily scraped from the car's windshield. This typical prior art ice scraper is hard to store because, as noted, it has an extended length handle. For example, the ice scraper will not fit inside a car's glove compartment. This means the ice scraper is either stored in the car's trunk where it may be hard to reach when use is required, or it is kept in the car's passenger compartment where it tends to clutter up the car's interior.

It is, therefor, the primary objective of this invention, to provide a hand tool, preferably in the form of an ice scraper, which includes a collapsible handle that allows the tool to be easily stored in, e.g., a car's glove compartment.

In accord with this objective, the improved hand tool of this invention, in preferred form, includes a frame of substantially rectangular closed loop configuration. Squeegee and ice scraper blades are fixed to one frame end, and a brush is fixed to an adjacent frame side. A handle is pivotally connected to the frame, and is movable between a storage position generally co-extensive with the other frame side and an extended position directed away from the closed loop frame and generally co-axial with the frame's longitudinal axis. The handle and the frame are grippable together by a user if desired upon use of the hand tool when the handle is in the storage position and, alternatively, the handle is grippable alone by a user if desired upon use of the hand toll when the handle is in the extended position. This hand tool results in a hand held ice scraper that is of a compact structure, and easily storable in, e.g., a car's glove compartment, when in the storage configuration.

Other objectives and advantages of the invention will be more apparent from the following detailed description taken in conjunction with the drawings in which.

Figure 1:
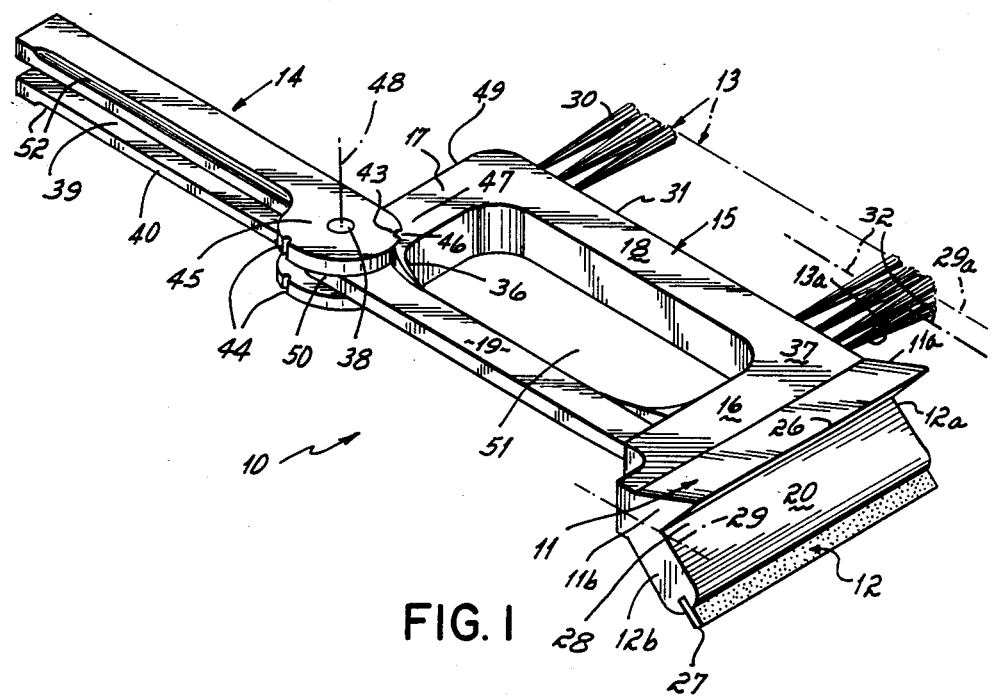
FIG. 1 is a perspective view of a hand tool in accord with the principles of this invention, the handle being shown in the extended or use position.
Figure 2:
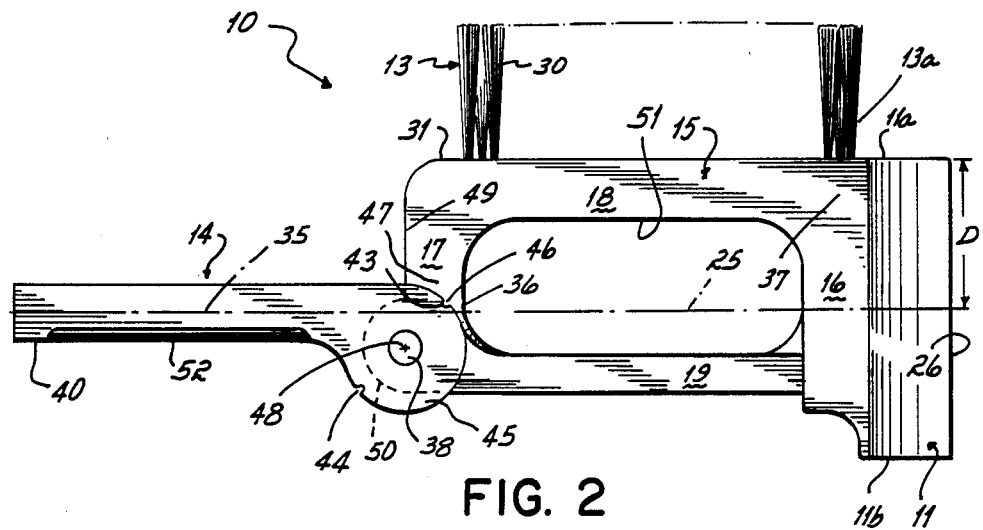
FIG. 2 is a top plan view illustrating the handle in the extended or use position.
Figure 3:
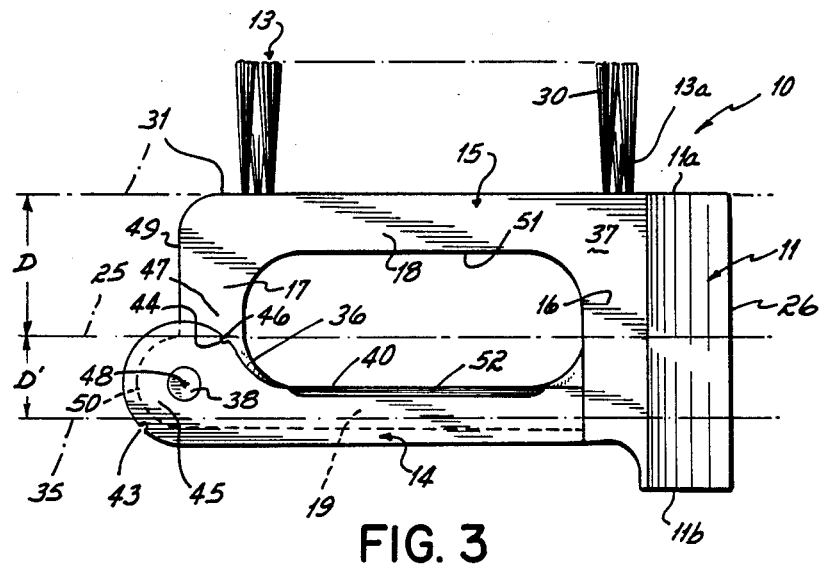
FIG. 3 is a top plan view similar to FIG. 2 illustrating the handle in the collapsed or storage position.

A hand tool 10, which includes an ice scraper blade 11, a rubber squeegee blade 12, and a brush 13, in accord with the principles of this invention, is illustrated in handle 14 closed or storage configuration in FIG. 3 and in handle extended or use configuration in FIGS. 1, 2 and 3.

Figure 4:
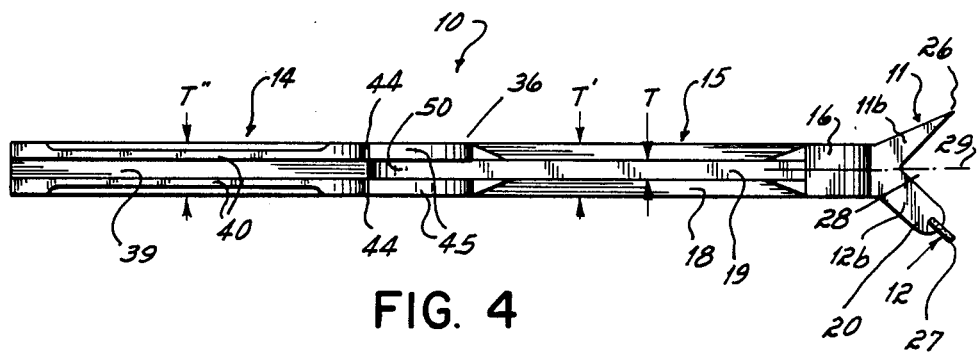
FIG. 4 is a side view of the handle shown in the extended or use position.

The hand tool 10 includes a frame 15 of substantially rectangular closed loop configuration. The frame 15 includes a front section 16, a rear section 17, and opposed side sections 18, 19, all of which are integral one with the other to provide the closed rectangular loop configuration. The rigid ice scraper blade 11 and the rubber squeegee blade 12 are mounted on the front end section 16 of the rectangular frame 15. The scraper blade 11 is formed integral with the frame 15, and the squeegee blade 12 is carried in a mount 20 also formed integral with the frame, the squeegee blade being oriented at an angle of substantially 90° relative to the scraper blade. Note the rectangular frame 15 has a major longitudinal axis 25, and this longitudinal axis is perpendicular to scraping edge 26 of the rigid ice scraper blade 11, and to squeegee edge 27 of the rubber squeegee blade 12. Note also the mouth 28 of the hand tool 10, as defined by the ice scraper blade 11 and squeegee blade 12, is bisected by the major plane 29 of the rectangular frame as shown in FIG. 4. Accordingly, the ice scraper blade's edge 26 is on one side of the rectangular frame's major plane 29 and the squeegee blade's edge 27 is on the other side of the frame's 15 major plane 29. Note also, therefor, that the frame's 15 major plane 29 is oriented parallel to the two blade edges 26, 27 which are also parallel one to the other.

The brush 13 is mounted on a first side section 18 of the rectangular frame 15. The brush's bristles 30 are fixed in that frame 15 so as to extend outwardly therefrom in the major plane 29 of the frame, i.e., in a direction parallel to the blades' edges 26, 27. Note that the scraper blade 11 and squeegee blade 12 do not extend beyond outer edge 31 of the frame's brush section 18. Accordingly, and when in use, the brush 13 is not hindered by either the scraper blade 11 nor the squeegee blade 12. Further, note particularly that the longitudinal axis 32 of the brush 13 is oriented perpendicular to edges 26, 27 of the scraper blade 11 and the squeegee blade 12. And also note particularly that the brush 13 is fixed on the rectangular frame so that one end 13a of the brush is immediately adjacent one ends 11a 12a of the scraper 11 and squeegee 12 blades. This orientation of the brush 13 relative to the blades 11, 12 along with the rectangular configuration of the frame 15, allows the hand tool 10 to be fabricated in a relatively compact configuration (as shown in FIG. 3) that is easily storable in, e.g., a car's glove compartment.

The handle 14 is of a generally linear configuration as illustrated by its longitudinal axis 35. The linear handle 14 is pivotally mounted on the rectangular frame 15 at a corner 36 thereof diagonally opposite to that corner 37 at which the blades, edges 11a, 12a and brush edge 13a are adjacent one to the other. The handle 14 is pivotally mounted on the frame 15 by pivot pin 38 fixed to the frame. That side section 19 of the frame 15 which does not mount the brush 13 instead cooperates with the handle 14 when the handle is in the closed configuration shown in FIG. 3. As shown in FIGS. 1 and 4, the frame side section 19 is in the form of a rib which is of a thickness T that is significantly less than the thickness T' of the frame's opposite side section 18. The thickness T' of the frame's opposite side section 18 is substantially equal to the thickness T'' of the linear handle 14. Further the linear handle 14 includes a slot 39 which extends along edge 40 thereof, the slot being of a depth and length to cooperate with the frame's rib 19 when the handle is in the closed position as shown in FIG. 3 so that the handle is oriented parallel to the frame side section 18.

The handle 14 and frame 15 include a latch system partially carried by each which holds the handle in the closed storage attitude shown in FIG. 3, as well as which holds the handle in the open use configuration shown in FIG. 2. This latch system includes two notches 43, 44 in each ear 45 of the handle's pivoted end, one notch 44 of those notches cooperating with an adjacent tit 46 on the frame rear section's shoulder 47 when the handle 14 is closed in order to hold it closed, and the other notch 43 of those notches cooperating with that same adjacent tit 46 when the handle is opened in order to hold it open. In this regard, note the handle pin 38 defines a pivot axis 48 for the handle 14 which is located on the outer edge 49 of the frame's rear section 17. The frame 15 itself also includes an ear 50 which extends beyond the generally rectangular periphery of it so as to cooperate with the handle's ears 45 in enhancing structural rigidity of the pivot joint.

The handle's longitudinal axis 35 is generally aligned with the tool frame's longitudinal axis 25 when the tool's scraper blade 11 or squeegee blade 12 is in use. These aligned longitudinal axes 25, 35, when the scraper blade 11 or squeegee blade 12 is used, is generally midway between the ends 11a 11b and 12a, 12b of those two blades, and generally normal thereto. In this configuration, which is illustrated in FIG. 2, note that the distance D between these longitudinal axes 25, 35 when it is in the open or use configuration and the outside edge 31 of the frame's brush section 18 is substantially equal to one-half the length of the blades 11, 12. Further note, as shown in FIG. 3, that when the handle 14 is in the closed or storage configuration the distance D' between the handle's longitudinal axis 35 and the tool frame's center's axis 25 is about half the distance between that center axis 25 and the adjacent outer ends 11b, 12b of the ice scraper 11 and squeegee 12 blades. In other words, the distance D between the tool's longitudinal axes 25, 35 and ends 11b, 12b of the blades when the handle is in the use position of FIG. 2 is about twice as great as the distance D' between the tool's longitudinal axis 25 and the handle's longitudinal axis 35 when the handle is in the storage configuration of FIG. 3.

In use of the hand tool 10 of this invention, and when it is desired to use the brush only, the handle 14 may be retained in the storage configuration illustrated in FIG. 3. In the storage configuration the handle 14 is gripped with a user's fingers extending through hand port 51 defined by the frame 15. With the handle 14 so gripped, the tool 10 can then be used in the form of a brush to, e.g., brush snow off a vehicle's windows. Note particularly that the hand port 51 defined by rectangular frame 15 is in a plane 29 parallel to the brush plane 29a, and this makes use of the tool as a brush in this FIG. 3 closed handle configuration quite easy for the user. In this attitude note also that the interior edges 52 of the handle 14 present curved edge surfaces for comfort to the user's hand. The handle 14 is maintained in the storage configuration with the frame's rib 19 by virtue of the handle's notches 44 interfitting with the frame's tits 46.

When it is desired to use the hand tool 10 as an ice scraper or squeegee, the handle 14 can be pivoted on axis 48 from the storage configuration shown in FIG. 1 into the extended configuration shown in FIG. 2. With the handle 14 so extended, it is latched in position by the notches 43 on the handle's ears 45 that interfit with the tits 46 on the frame's shoulders 47. In this use position, and as explained before, the handle's longitudinal axis 35 is now aligned with the tool's longitudinal axis 25 which makes for easy use of the tool when, e.g., its ice scraper blade is used to remove ice from an automobile's windshield.

Having described in detail the preferred embodiment of my invention, what I desire to claim and protect by Letters Patent is:

1. A hand tool comprising
   a frame of substantially closed loop configuration,
   at least one of a squeegee blade and an ice scraper blade fixed to a first section of said closed loop frame, and
   a handle movably connected to a second section of said closed loop frame, said handle being movable between a storage position generally co-extensive with said second section and an extended position directed away from said closed loop frame, if desired said handle and said closed loop frame being grippable together by a user's hand upon use of said hand tool when said handle is in said storage position and, alternatively, if desired said handle being grippable alone by a user's hand upon use of said hand tool when said handle is in said extended position.

2. A hand tool as set forth in claim 1, said tool comprising
   a brush fixed to a third section of said closed loop frame.

3. A hand tool as set forth in claim 2, said frame being of a generally rectangular configuration, said first and third sections being oriented generally perpendicular one to the other.

4. A hand tool as set forth in claim 3, one end of said brush terminating adjacent one end of said blade.

5. A hand tool as set forth in claim 4, said handle being pivotally mounted adjacent a corner of said closed loop frame directly opposite that corner of said frame at which said brush and said blade end are adjacent one to the other.

6. A hand tool as set forth in claim 3, said frame's second section being oriented generally parallel to said frame's third section.

7. A hand tool as set forth in claim 6, said handle having one of a rib and a slot along its length, and said frame's second section having the other of a rib and a slot along a corresponding length, said rib and said slot cooperating to locate said handle in said storage position.

8. A hand tool as set forth in claim 7, the center line of said handle being positioned about midway between the ends of said blade and generally perpendicular to said blade when said handle is in said extended position, but the center line of said handle being positioned about midway between the center of said blade and one end of said blade when said handle is in said storage position.

9. A hand tool as set forth in claim 8, said handle being generally linear in configuration, said handle being oriented generally normal to said blade when said handle is in both said storage and extended positions, and said handle's longitudinal axis being spaced from said brush a distance equal to at least about half the length of said blade when said handle is in both of said storage and extended positions.

10. A hand tool as set forth in claim 9, said tool comprising
    a latch system partially carried by said handle and partially carried by said frame, said latch system functioning to latch said handle in both said storage position and said extended position.

11. A hand tool as set forth in claim 10, said handle being pivotally connected to said closed loop frame, said latch system comprising
   at least one notch defined in one of said handle and said frame, and at least one tit carried by the other of said handle and said frame.

12. A hand tool as set forth in claim 1, said tool comprising
   a latch system partially carried by said handle and partially carried by said frame, said latch system functioning to latch that handle in both said storage position and said extended position.

13. A hand tool as set forth in claim 12, said handle being pivotally connected to said frame, said latch system comprising
   at least one notch defined in one of said handle and said frame, and at least one tit carried by the other of said handle and said frame.

14. A hand tool as set forth in claim 12, said handle having one of a rib and a slot along its length, and said frame's second section having the other of a rib and a slot along a corresponding length, said rib and said slot cooperating to locate said handle in said storage position.

15. A hand tool as set forth in claim 14, said handle being generally linear in configuration, and said handle being oriented generally normal to said blade when said handle is in both of said storage position and said extended position.

16. A hand tool as set forth in claim 15, the center line of said handle being positioned generally midway between the ends of said blade when said blade is in said extended position, but the center line of said handle being positioned about midway between the center of said blade and one end of said blade when said handle is in said storage position.

* * * * *